United States Patent
Meunier et al.

(10) Patent No.: US 8,897,934 B2
(45) Date of Patent: Nov. 25, 2014

(54) METHOD OF PROTECTING AN AIRCRAFT BY SIGNALLING AGAINST THE RISKS OF COLLISION WITH THE TERRAIN IN PROCEDURES WITH REDUCED PROTECTION CORRIDOR

(75) Inventors: Hugues Meunier, Frouzins (FR); Nicolas Marty, Saint Sauveur (FR); Aurélie Sallier, Toulouse (FR)

(73) Assignee: Thales, Neuilly-sur-Seine (FR)

( * ) Notice: Subject to any disclaimer, the term of this patent is extended or adjusted under 35 U.S.C. 154(b) by 1317 days.

(21) Appl. No.: 12/268,798

(22) Filed: Nov. 11, 2008

(65) Prior Publication Data

US 2009/0157241 A1 Jun. 18, 2009

(30) Foreign Application Priority Data

Nov. 14, 2007 (FR) ...................... 07 07992

(51) Int. Cl.
 *G01C 5/00* (2006.01)
 *G05D 1/00* (2006.01)
 *G05D 3/00* (2006.01)
 *G06F 7/00* (2006.01)
 *G06F 17/00* (2006.01)
 *G01S 13/94* (2006.01)
 *G08G 5/00* (2006.01)
 *G08G 5/02* (2006.01)

(52) U.S. Cl.
 CPC .............. *G01S 13/94* (2013.01); *G08G 5/0086* (2013.01); *G08G 5/025* (2013.01); *G08G 5/0065* (2013.01)
 USPC .......................................................... 701/9

(58) Field of Classification Search
 CPC .................................... G08G 5/0086

USPC ................. 701/1, 3, 8–10, 14, 301; 244/75.1; 340/945–946
See application file for complete search history.

(56) References Cited

U.S. PATENT DOCUMENTS

| | | | | |
|---|---|---|---|---|
| 6,484,071 | B1 * | 11/2002 | Conner et al. | 701/9 |
| 6,567,728 | B1 * | 5/2003 | Kelly et al. | 701/9 |
| 6,571,155 | B2 * | 5/2003 | Carriker et al. | 701/3 |
| 6,720,891 | B2 * | 4/2004 | Chen et al. | 340/969 |
| 6,826,459 | B2 * | 11/2004 | Conner et al. | 701/9 |
| 6,995,690 | B1 | 2/2006 | Chen et al. | |
| 7,693,618 | B2 * | 4/2010 | Johnson et al. | 701/8 |

(Continued)

FOREIGN PATENT DOCUMENTS

| | | |
|---|---|---|
| EP | 1857781 A2 | 11/2007 |
| FR | 2893146 | 5/2007 |
| FR | 2893146 A1 | 5/2007 |
| WO | 2005124279 A1 | 12/2005 |

*Primary Examiner* — Khoi Tran
*Assistant Examiner* — Harry Oh
(74) *Attorney, Agent, or Firm* — Lowe Hauptman & Ham, LLP (57) ABSTRACT

Described is a method of protecting an aircraft in approach by signalling against risks of collision with a terrain in steep-sided environments in order to avoid unwanted warnings emanating from clearance sensors of the on-board TAWS (Terrain Awareness and Warning System) while protecting the aircraft when the aircraft fails to observe a published procedure which includes a landing procedure and a take-off procedure. The method, in some embodiments, includes modifying characteristics of at least one of the clearance sensors according to the position deviation of the aircraft relative to a published RNP (Required Navigation Performance) trajectory.

8 Claims, 5 Drawing Sheets

(56) References Cited

U.S. PATENT DOCUMENTS

| | | | |
|---|---|---|---|
| 8,121,746 B2* | 2/2012 | Francois et al. | 701/4 |
| 8,306,679 B2* | 11/2012 | Meunier et al. | 701/9 |
| 8,515,600 B1* | 8/2013 | McCusker | 701/9 |
| 2002/0097169 A1* | 7/2002 | Johnson et al. | 340/970 |
| 2007/0225043 A1* | 9/2007 | Hieatt et al. | 455/562.1 |
| 2008/0288169 A1* | 11/2008 | Meunier et al. | 701/301 |
| 2008/0306639 A1* | 12/2008 | Fleury et al. | 701/7 |
| 2010/0042273 A1* | 2/2010 | Meunier et al. | 701/9 |

* cited by examiner

METHOD OF PROTECTING AN AIRCRAFT BY SIGNALLING AGAINST THE RISKS OF COLLISION WITH THE TERRAIN IN PROCEDURES WITH REDUCED PROTECTION CORRIDOR

RELATED APPLICATIONS

The present application is based on, and claims priority from, French Application Number 07 07992, filed Nov. 14, 2007, the disclosure of which is hereby incorporated by reference herein in its entirety.

FIELD OF THE INVENTION

The present invention relates to a method of protecting an aircraft by signalling against the risks of collision with the terrain in procedures with reduced protection corridor, in order to avoid unwanted warnings emanating from the clearance sensors of the onboard system for automatically signalling risks of collision with the terrain.

BACKGROUND OF THE INVENTION

The present invention relates to a method of protecting an aircraft by signalling against the risks of collision with the terrain in procedures with reduced protection corridor with functions specific to these procedures, in order to avoid unwanted warnings emanating from the clearance sensors of the onboard system for automatically signalling risks of collision with the terrain.

The onboard systems for automatically signalling risks of collision with the terrain, commonly designated by the term "TAWS" ("terrain awareness and warning system") are stand alone computers or computers integrated with other functions such as the TCAS and WXR in onboard ISS ("integrated surveillance system") type systems. These TAWS systems fulfil an anticollision surveillance function ("safety net") with the terrain and their aim is to issue audible warnings on an unintentional approach with the relief, so enabling the crew to react by engaging a vertical resource (called "pull-up") to avoid the relief before it is too late. To do this, the TAWS systems, independently of the onboard navigation systems, periodically compare the predicted trajectory of the aircraft—including the theoretical trajectory that the aircraft would describe in a "pull-up" type resource—with the terrain being flown over obtained from an onboard digital terrain model (preferably a world model) installed on the computer.

In order to satisfy the increasing demands in terms of air traffic capacity and efficiency, in particular to allow access to certain terrains in steep-sided environments (such as Palm Springs, Calif., or Queenstown, New Zealand), new approach procedures have been introduced (in 2005 in the USA, then elsewhere). These approaches are known by the term RNP, and in particular for some by the name—RNP AR APCH (RNP authorization required approach), previously called RNP SAAAR (required navigation performance—special aircraft aircrew authorization required). They are defined in the ICAO documents referenced PBN No. 9613 and FAA Notice 8260.52 (PBN stands for "performance based navigation").

The design of these approach procedures is fairly flexible in their creation, because this design is based on the demand for a high level, defined by the standards, of accuracy and integrity of positioning on board the aircraft which will be required to follow this approach. The RNP procedures (predefined trajectories) define a corridor created with a lateral and vertical "framing" determined with a predefined high level of integrity. The RNP AR APCH approaches correspond to approaches with RNPs (lateral distance of the trajectory of the aircraft at the nearest edge of the corridor) typically between 0.3 NM and 0.1 NM (NM standing for nautical miles), that is that the distance for which the RNP AR APCH procedures are defined is equal to twice the value of the RNP between the route to be followed and each side of the procedure so as to protect the route of the aircraft from potential obstacles with a probability of $1.10^{-5}$, the lateral deviation tolerance of 0.3 to 0.1 NM relative to the prescribed ideal RNP AR APCH trajectory being given for 95% of cases. Furthermore, these approaches require the aircraft and the crew to be specially provided with special qualifications to be performed.

It will be noted that there are currently several RNP-type and similar procedures ("low RNP"), ("RNP AR APCH", "RNAV", etc.). Hereinafter in the text, they will simply be named RNP, but obviously this term here designates any procedure with reduced protection corridor.

On such RNP approaches, the trajectory to be followed is often close to the terrain and along a predefined path, rarely in a straight line. A TAWS system is therefore, even more than for other approaches or situations close to the ground, a precious aid and is even mandatory to perform this type of approach.

However, even more than for other approaches, such a TAWS system ought not to generate unwanted warnings. In practice, such warnings can place the aircraft in extremely difficult situations, because avoidance manoeuvres are not always easy to execute along such approaches.

Now, the design of the current TAWS is such that the protection and warning logics are totally independent of the trajectories followed by the aircraft, because the trajectories to be protected are often less constrained, with or without FMS engaged, than these new approaches, which, it should be remembered, require special authorizations on a per-case basis to be able to be followed.

Consequently, although the TAWS logics are well dimensioned for the general cases, they can be the source of unwanted warnings in RNP approaches, and in particular RNP AR APCH approaches, because the current warning logics are based on a prediction of the future position of the aircraft which cannot be really the position that the aircraft will have a few instants later.

Typically, the current TAWS systems basically comprise at least one or two (even several) clearance sensors, that is, virtual surfaces calculated by the onboard computer and delimiting an exploration volume of the space that is compared to the topography of the corresponding terrain as supplied by an onboard terrain database. The origin of these clearance sensors is located at the predicted position of the aircraft, and consists of an extrapolation of the current trajectory followed by a trajectory representing, taking into account a margin, an avoidance trajectory, and this in a lateral segment to take account of lateral tolerances.

These clearance sensors are determined from parameters of the aircraft such as position, speed, heading or route, altitudes or heights, etc., supplied by the sensors on board this aircraft.

These clearance sensors are used to determine the risks of collision with the terrain by using a database containing at least the elevations of the different areas being flown over.

Figure 1:
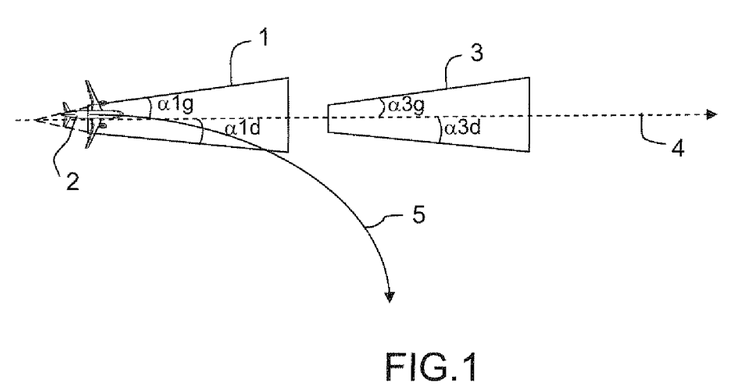
FIG. 1 is a simplified diagram explaining the generation of a warning type alert.

As illustrated in FIG. 1, the first clearance sensor (1) is determined at most a few seconds in front of the aircraft (2) and is dedicated to the generation of a "warning" type alert (warning of danger involving a resource manoeuvre called "pull-up"). Advantageously, another clearance sensor is determined (3), more in front of the aircraft (typically 30 seconds), and is dedicated to the generation of a "caution" type alert (that is: "attention!") of lesser importance. As illustrated in FIG. 1, which relates to the case of an initial straight-line trajectory, followed, a little after the instant at which the aircraft has been represented, by a trajectory tending towards the right, as long as this trajectory is straight, these clearance sensors have as their common generation axis the instantaneous route 4 of the aircraft. The problems posed by the curvilinear trajectory (5) are explained hereinbelow with reference to FIGS. 3 to 5 more particularly for the "caution" clearance sensor, even though, to a lesser extent, this problem also concerns the "warning" clearance sensor, provided that its start is not geolocated with the current position of the aircraft.

In certain TAWS systems, the generation axis of the "caution" clearance sensor, like that of the "warning" clearance sensor, is situated in the axis of the instantaneous route of the aircraft (as represented in FIG. 1). In other, more sophisticated TAWS systems, at least one of the clearance sensors, and in particular the "caution" clearance sensor, is situated and oriented along the predicted trajectory of the aircraft, according to a law which is a function of all or part of the instantaneous roll rate. Furthermore, the opening angle (angle of each of the sides of the clearance sensor relative to its generation axis: $\alpha 1g$ and $\alpha 1d$ for the clearance sensor 1 and $\alpha 3g$ and $\alpha 3d$ for the clearance sensor 3) of the clearance sensors is more or less great, opening in the direction of the turn, according to a law which is a function of all or part of the instantaneous roll rate, as represented in FIG. 1.

Figure 2:
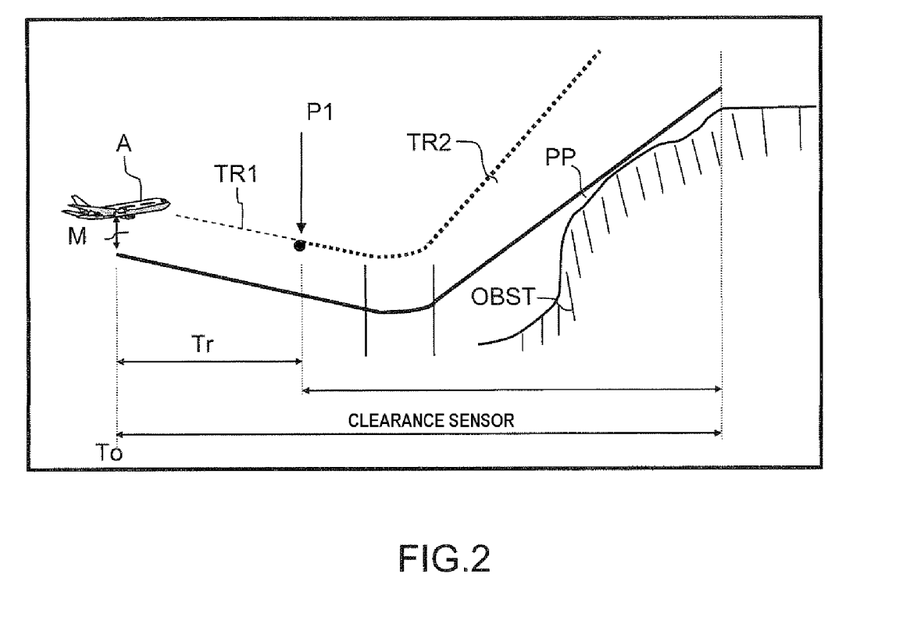
FIGS. 2 and 2A are simplified diagrams explaining a conventional clearance sensor.
Figure 2A:
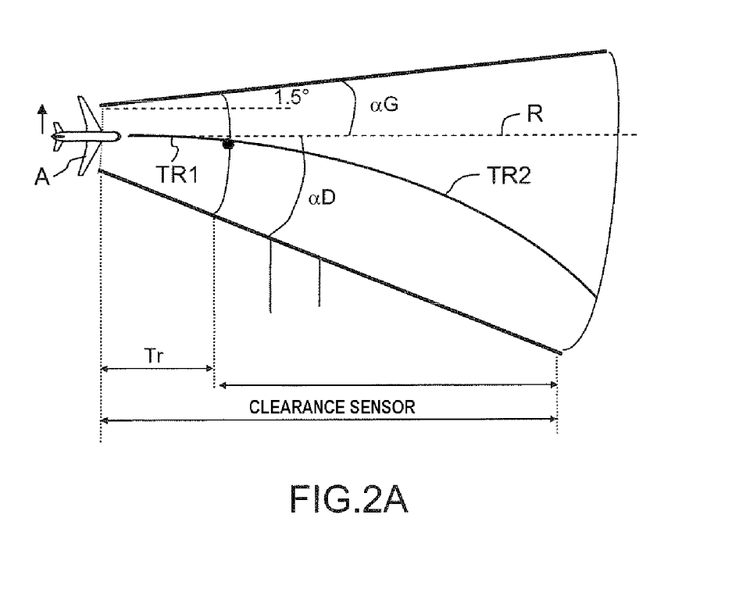

FIGS. 2 (lateral view) and 2A (top view) are diagrams explaining a conventional clearance sensor as considered for the present invention, but without excluding other forms of clearance sensor to which the present invention would be applied. This clearance sensor is created so as to cover the case of a "pull-up" manoeuvre that an aircraft A (represented at an instant T0) must undertake at the latest at a point PI (that the aircraft will reach after a time period Tr) in order to avoid an obstacle OBST (a hill, for example) situated in front of the aircraft A. A vertical distance between the clearance sensor and the obstacle OBST is defined so that the resource that the aircraft A must begin at the latest at the point P1 is such that the trajectory TR2 of the aircraft beyond P1 will make it possible to retain at least a margin M with the obstacle. In the top view of FIG. 2A, R represents the direction of the route of the aircraft before it begins its obstacle avoidance manoeuvre to the right. Bold lines represent the lateral limits of its "warning" clearance sensor. The left limit forms an angle $\alpha G$ (typically 1.5°) relative to the direction R, and the right limit forms an angle $\alpha D$, greater than $\alpha G$, relative to the direction R.

Figure 3:
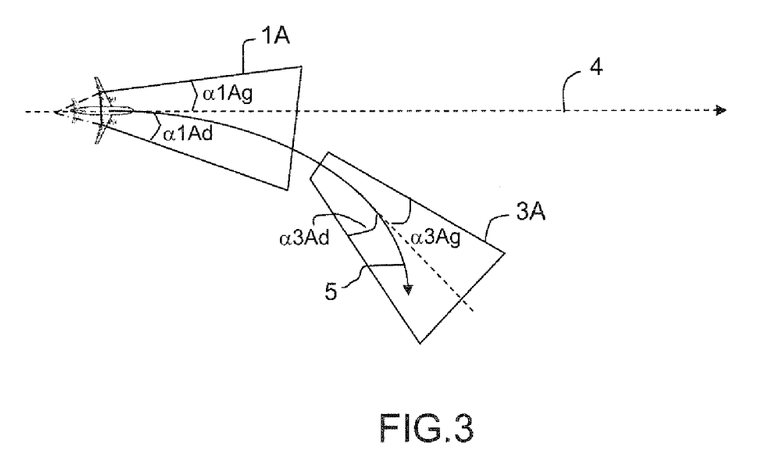
FIGS. 3-5 are simplified diagrams showing the aircraft at the beginning of a curved trajectory.

FIG. 3 relates to the case where the aircraft 2 is on the point of beginning a curved trajectory 5 to the right, in the absence of published RNP trajectory. In the case of more sophisticated known TAWS systems, the system then calculates a "warning" clearance sensor 1A, the generation axis of which is oriented along the instantaneous axis of the aircraft at the start point of this clearance sensor and the opening angle $\alpha 1Ad$ of which is greater than the angle $\alpha 1d$ of FIG. 1, and a "caution" clearance sensor 3A also oriented along the instantaneous axis of the aircraft at the start point of this clearance sensor (notably offcentred relative to the axis of the trajectory 4 and the opening angle $\alpha 3Ad$ of which is greater than the angle $\alpha 3d$ of FIG. 1).

Figure 4:
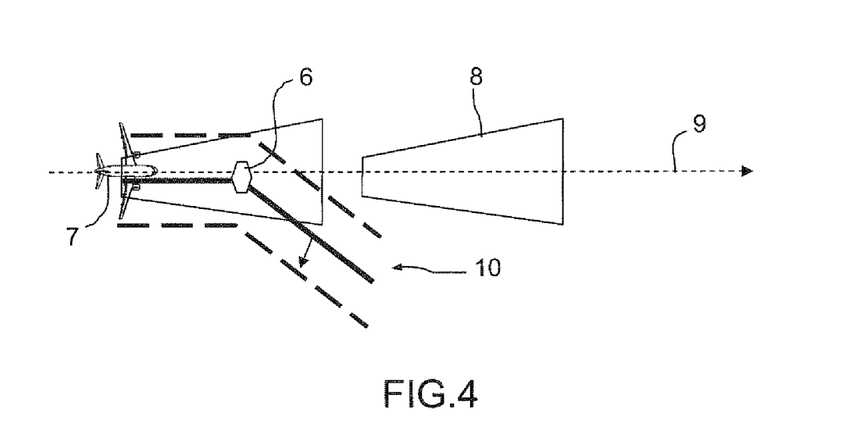
Figure 5:
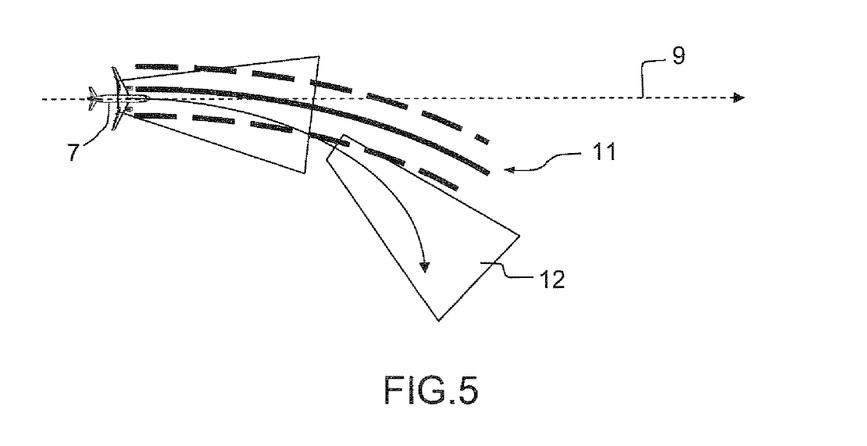

Even if such a prediction can still be acceptable for the "warning" clearance sensor, it may prove "unorthodox" for the "caution" clearance sensor relative to the reality of the procedure. The predicted positions can thus be notably offset relative to the accepted position tolerance (1 or 2 RNP). Similarly, the exploration segment (the opening angle of the clearance sensor) can notably be offcentred relative to the very probable future orientation of the aircraft. In practice:

As represented in FIG. 4, in the presence of a "turning point" 6 on the trajectory in front of the aircraft 7 predetermined by the published RNP procedure that the aircraft must follow, the "caution" clearance sensor 8 may be situated and remain oriented along the predicted trajectory 9, totally different from the position and the probable future orientation of the aircraft in 30 seconds (RNP trajectory 10 turning to the right from the turning point 6), hence a certain increase in the probability of generating unwanted warnings. In this FIG. 4, as in the subsequent figures, the RNP trajectory has been represented by a "corridor" delimited by broken bold lines and its axis is represented by a continuous bold line. Obviously, the width of this corridor is modulated according to the definition of the procedure.

Similarly, if the predicted trajectory of the aircraft, according to a law which is a function of all or part of the instantaneous roll rate, is greater (as in FIG. 5), or less than the actual rate of turn of the trajectory prescribed by the published RNP procedure, it can prove "unorthodox" relative to the reality of the procedure and thus be notably offset relative to the trajectory to be followed. Taking into account the instantaneous roll of the aircraft 7 to determine the position of the caution clearance sensor 12 can cause this clearance sensor to examine an inappropriate segment, outside the RNP trajectory 11.

It should be noted that, even if, for such approaches, the aircraft must be qualified to perform RNP approaches and have onboard systems guaranteeing the precision and the integrity of the aircraft position, its TAWS must remain operational to monitor errors of altitude and to intervene in the case of failure to observe the required precision, for example in the case of failure of certain onboard systems.

This therefore means, for the TAWS, having an operation with the fewest unwanted warnings when the aircraft follows the prescribed procedure, and on the other hand fully retaining its nominal warning mode when this procedure is no longer followed.

A terrain avoidance device for aeroplanes is known according to the patent application EP 1 857 781 A2, in which it is simply specified that the "warning" clearance sensor alone is reduced so as to enter into the RNP volume and possibly offcentred to be "centred" on the RNP trajectory, which does not make it possible to adapt the clearance sensor to all the RNP situations and avoid unwanted warnings. Similarly, a terrain avoidance device for aeroplanes is known from the U.S. Pat. No. 6,567,728, in which the limitation of false alarms in approach is based on an inhibition cone centred on the "glide/localizer", which presents the same drawbacks.

SUMMARY OF THE INVENTION

One object of the present invention is a method of protecting an aircraft in approach phase by signalling against the risks of collision with the terrain in constrained environments, in order to avoid unwanted warnings emanating from the clearance sensors of the onboard TAWS system for automatically signalling risks of collision with the terrain, while protecting the aircraft when it fails to observe the published procedure, and this equally in a landing procedure and in a take-off procedure.

Another object of the present invention is a device for implementing this method, a device that is easy to put in place and requires only the minimum possible modifications of the existing equipment.

The method according to the invention consists, when the aircraft follows an RNP procedure, in adjusting the characteristics of at least one clearance sensor of an onboard TAWS system for automatically signalling risks of collision with the terrain to the characteristics of the imposed RNP trajectory as defined in an onboard database in the aircraft. These characteristics are at least one of the following: their orientation, opening, length, width, position, gradient.

Advantageously, the method according to the invention consists in modifying said characteristics of one or more clearance sensors as currently defined in the existing TAWS according to the transversal position deviation of the aircraft relative to the imposed RNP trajectory.

According to another feature of the invention, the system determines the period of time during which these modifications of the characteristics of the clearance sensors are applied, that is, when the aircraft follows an RNP procedure.

According to another feature of the invention, a specific warning (typically "recover altitude") is generated when in RNP mode the system determines, under the prescribed altitude of the RNP trajectory, a distance between the profile of a clearance sensor and the profile of the terrain being flown over that is less than a predetermined threshold.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

The aim of the inventive method is to satisfy the operational objectives expected of the TAWS systems and the current limitations on their operation in RNP approaches, namely:

minimization of the occasional unwanted warnings in these RNP-type approaches,
conventional protection when the procedure is no longer followed, that is, switchover to conventional TAWS operation.

Moreover, the object of the present invention is to satisfy the operational objectives expected of the TAWS systems with the minimum of modifications to the logics of these systems, that is, by observing and being compatible with the principles currently implemented in these so-called "conventional" TAWS.

The inventive method is based on the taking into account by the TAWS system of the RNP AR APCH procedure to be followed (also here called RNP procedure) as published. Each RNP procedure that is compatible with the possibilities of the TAWS is stored in the equipment (or supplied by other onboard equipment such as the FMS, or other system—or even obtained by "datalink").

In order to minimize the potential unwanted warnings in RNP-type approaches, the inventive method consists in using the published RNP procedure (the trajectory to be followed) to best position and/or orient the clearance sensors, more particularly the "caution" clearance sensor which is the most distant from the aircraft, so as to limit the angular excursions of the clearance sensor or sensors concerned.

Figure 6:
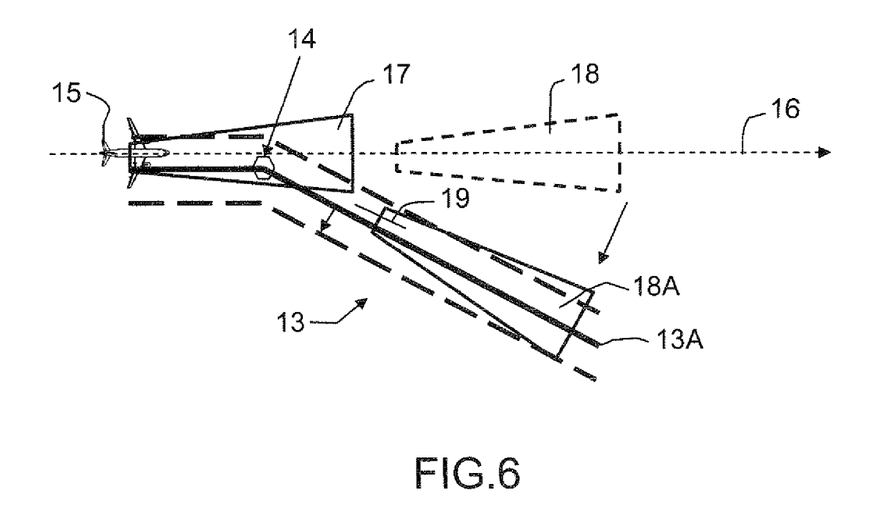
FIG. 6 is a diagram explaining the implementation of the method according to the present invention.

FIG. 6 diagrammatically represents the manner in which the inventive method modifies the position and/or the orientation of at least one of the clearance sensors of the TAWS system. In this diagram, it is assumed that, just before beginning a turn to the right imposed by a published RNP trajectory 13 from a turning point 14, the aircraft 15 was following a straight-line trajectory 16 and the "warning" clearance sensor 17 is centred on this trajectory 16 and contains the turning point 14. Without the intervention of the inventive method, the "caution" clearance sensor 18 would also be centred on the trajectory 16, that is completely outside the RNP trajectory 13.

Now, thanks to the inventive method, the method of predicting the position and/or the orientation and/or the opening takes into account the predefined RNP trajectory. As a consequence, the "caution" clearance sensor is constrained with a determined opening and/or to occupy a position and/or an orientation that takes account of the RNP trajectory: the position of the new "caution" clearance sensor 18A is determined according to the published trajectory taking into account the lateral position bias of the aircraft with respect to this published trajectory. In the present example, the predicted position of the start of the clearance sensor is represented by a segment 19, slightly laterally offset relative to the axis 13A of the trajectory 13, but the origin of this clearance sensor is contained in the limits of the corridor of the RNP trajectory. The orientation of the clearance sensor 18A can also coincide with that of the segment 15A indicating the predicted position of the start of this clearance sensor. Advantageously, this orientation can take account of the rate of turn required between two segments of the predicted trajectory. Moreover, in the present case, the opening angle of the clearance sensor 18A remains that of a straight-line trajectory (the same angle as that of the clearance sensor 18). Advantageously, the opening angle of at least this clearance sensor can be modulated taking into account changes of direction between two consecutive segments of this published RNP trajectory.

When the aircraft deviates too far from the prescribed trajectory, a conventional-type protection must be provided by the TAWS. The predicted position along the trajectory is no longer necessarily in this case the most probable position. A return to the nominal mode (prediction of the position of the clearance sensors as currently performed in the conventional TAWS systems) is necessary.

Consequently, according to another characteristic of the invention, the operating mode of the TAWS system depends on the lateral deviation of the estimated position of the aircraft relative to the prescribed trajectory. This deviation is generally supplied by the FMS on board the aircraft or derived from the navigation quality factor determined by the onboard FMS.

The various possibilities of implementing this process are then as follows (the position deviation thresholds mentioned hereinbelow can be adapted to each case of use):

If the estimated position presents a lateral deviation of less than 1 RNP relative to the prescribed trajectory, the positioning and/or the orientation of the clearance sensor or sensors and their opening angle are as explained hereinabove with reference to FIG. 6. In this mode, the TAWS no longer functions in "conventional" mode but in "RNP"mode.

If the estimated position presents a lateral deviation of more than 2 RNP relative to the prescribed trajectory, the positioning and/or the orientation and/or the opening angle of the clearance sensors continue to be determined according to the prior art by the TAWS operating conventionally ("conventional" mode).

If the estimated position presents a lateral deviation of more than 1 RNP but less than 2 RNP relative to the prescribed trajectory, the position and/or the orientation and/or the opening angle of the clearance sensors result from a combination (such as averaging) between the above two methods ("transition" mode). It should be noted that this mode may not exist in certain implementations of the invention if the low and high limits correspond to the same lateral deviation.

This new "RNP" operating mode (or these new "RNP" and "transition" operating modes) can be triggered automatically (failing other manual commands or commands obtained, for example, from the FMS) by detection of the correlation at a given instant of the estimated position with a point of these procedures (on arrival as on take-off), typically one of the input points of these procedures.

It will be noted that, of course, the reduction of the unwanted warnings also advantageously involves:

1) The use of a terrain database with a greater resolution than that used in the TAWS of the prior art (typically 30 or 15 arc-seconds).

2) The adjustment of the width of the clearance sensors to a value compatible with the authorized width of the RNP procedure or the precision of the aircraft position. Typically, currently, the width of this foot is taken to be equal to 100 m corresponding to the position inaccuracy to 1 sigma of the GPS.

3) The adjustment of the length of the clearance sensor locally according to the characteristics of the trajectory (for example, the rate of turn of the procedure at certain points, etc.). Typically, in the prior art, the length of the clearance sensors is adjusted according to the proximity with the closest runway for airports in mountainous areas.

4) The local adjustment of the origin longitudinal position of the clearance sensors (in particular, the caution clearance sensor) according to the characteristics of the trajectory (for example, the rate of turn of the procedure at certain points, etc.).

5) The local adjustment of the gradient of the clearance sensors (in particular, of the caution clearance sensor) according to the characteristics of the trajectory (for example, the rate of turn of the procedure at certain points, etc.).

Figure 7:
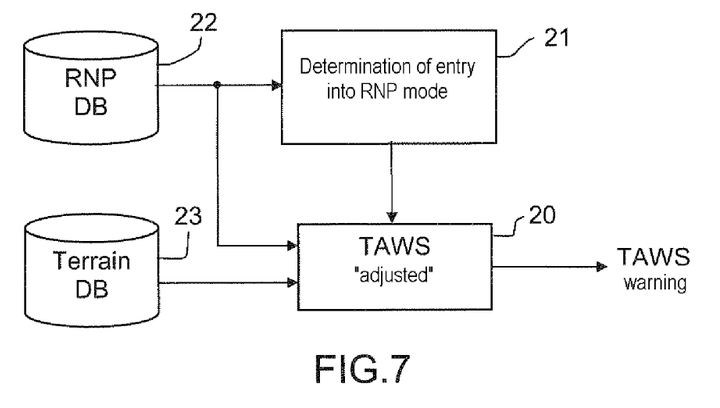
FIGS. 7 and 8 are simplified block diagrams of two variants of a system implementing the method of the invention.
Figure 8:
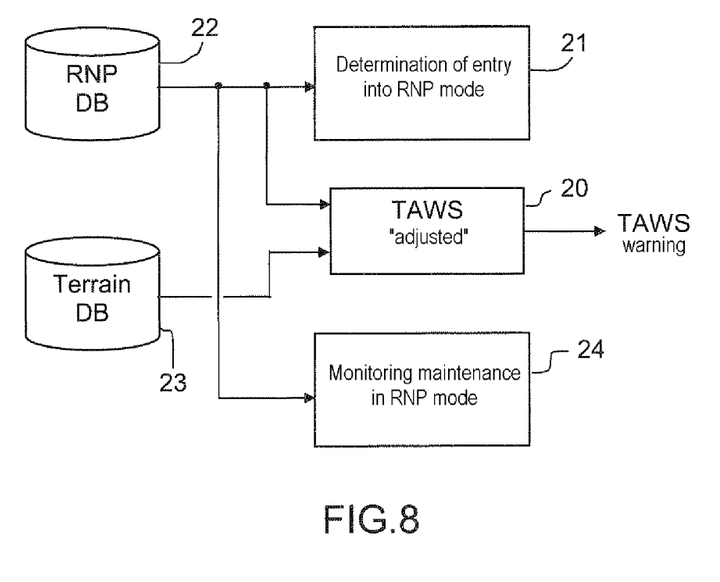

FIGS. 7 and 8 are block diagrams of possible embodiments of a system implementing the inventive method.

The embodiment of FIG. 7 essentially comprises a conventional TAWS 20 adapted to modify the characteristics of the clearance sensors according to the position deviation of the aircraft relative to the imposed RNP trajectory, as explained hereinabove with reference to FIG. 6, while having a conventional TAWS behaviour in the absence of engagement of RNP procedure, and advantageously a "transition" operating mode between the two procedures.

The TAWS 20 is responsible for sending the warnings in conventional operating mode and when following the RNP procedure. The TAWS 20 is driven by a device 21 for activating the RNP mode. This activation (or inhibition) of the RNP mode makes it possible to switch between the RNP mode and the conventional mode, but advantageously with a transition function between the two modes, which performs an averaging (or barycentring) between the positions and/or orientations and/or openings of the clearance sensor or sensors between the values that it/they would have in each of the modes, in order to enable a "flexible" transition (without abrupt variations from one position/orientation/opening to another).

The entry into the RNP mode is designed as the result of a comparison of the current position of the aircraft with the position or positions of the input points of a stored RNP procedure, if the result of this comparison is less than a maximum deviation (typically of + or −1 or 2 RNP).

The presence in the mode is designed as the mapping of the current position of the aircraft with any point on the stored RNP procedure, given a maximum lateral deviation (typically of + or −1 or 2 RNP).

The maintenance in the RNP mode is designed either as the mapping of the current position of the aircraft with a point on the stored RNP procedure, given a maximum lateral deviation (typically of + or −1 or 2 RNP), or as the prediction, given the instantaneous speeds and route of the aircraft and, advantageously, its roll and/or its dynamics, of the coincidence of the position of the aircraft with any point of the stored RNP procedure, given a maximum lateral deviation (typically of + or −1 or 2 RNP).

A database RNP-DB 22 is linked to the two devices 20 and 21, whereas the TAWS 20 is linked elsewhere to a high-resolution terrain database 23. The database 22 comprises all the data relating to the geometrical description of the planned RNP procedures, whereas the database 23 comprises the high-resolution data. In practice, currently, the terrain databases are used with cells of resolution (size of the side of these cells) equal to 30 arc-seconds (seconds of arc), that is, ½ NM, or even, sometimes, for airports in mountainous areas, 15 arc-seconds (that is, ¼ NM). However, the present invention preferably uses a "high-resolution" terrain database, that is, a resolution such that the size of the cells is less than these current values, for example typically approximately 6 arc-seconds or 3 arc-seconds, even 1 arc-second. These high-resolution data relate to the terrain profiles located under the RNP corridors. These data can be calculated out of use, on production of the database 22, and they can advantageously be validated on RNP test flights.

The system diagrammatically represented in FIG. 8 relates to a variant of that represented in FIG. 7, and the same elements therein are assigned the same numerical references as in FIG. 7. The main difference compared to the system of FIG. 7 is that that of FIG. 8 also comprises a device 24 for monitoring the maintenance of the system in the RNP mode. This device 24 is linked to the database 22. It checks the rate of compliance by the aircraft with the RNP procedure according to the deviation of the instantaneous position relative to the prescribed position and according to the speed of divergence of the instantaneous heading and the instantaneous speed relative to that which is prescribed by the procedure, and according to the instantaneous roll rate (which amounts to determining the possibility of reverting to the RNP procedure, given the tolerances accepted for these parameters by the RNP procedure), and communicates to the TAWS the value of the quality of compliance with the RNP procedure for the latter to be able to adopt the appropriate operation (one of the three modes described hereinabove with reference to FIG. 6).

The operation of the devices 21 and 24 is based on the correlation between the position of the aircraft and the RNP trajectory predefined in the database and the determination of the probability of maintaining in the mode taking into account the dynamic of the aircraft, its position and its instantaneous route relative to the RNP trajectory predefined in the database.

In another embodiment, the TAWS 20 is adapted as follows. The starting point is a conventional TAWS that is analysed in the laboratory by simulating all the possible RNP approach situations. For each problem encountered, that is, each time at least one of the TAWS clearance sensors produces a false alarm, the characteristics of the clearance sensors concerned are adjusted locally. The fact that this adjustment is performed locally means that it is performed for a given geographic area and/or for a given aircraft speed and/or for a given heading of this aircraft. The clearance sensor characteristics concerned are, as specified hereinabove, their orientation, opening, length and width, and possibly their position and their gradient.

The advantages of the inventive solution are as follows:
enhanced prediction of the positioning, and/or of the orientation and/or of the opening of the existing clearance sensors of the "conventional" TAWS (operating in RNP-specific mode),
continuity between the RNP-specific mode and the conventional TAWS mode in the event of exiting from following the RNP procedure.

The main characteristics of the inventive solution are:
determination of the entry into a RNP procedure,
"recover altitude" specific warning if the altitude of the aircraft is too low on the RNP trajectory being followed,
cropping of the length of the clearance sensors according to at least one of the place criteria (geographic position, distance on the trajectory),
advantageous use of a terrain database having a greater resolution,
adjustment of the width of the clearance sensor according to the required RNP level,
locally inhibited false alarms.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of protecting an aircraft by automatically signaling against risks of collision with a terrain in a constrained environment when the aircraft follows a procedure with reduced protection corridor,
said procedure defining a published trajectory to be followed by the aircraft along a predefined path located inside said reduced protection corridor, said published trajectory corresponding to an absolute geographical trajectory being published by authorized authorities and stored in an onboard database in the aircraft,
said aircraft comprising an onboard Terrain Awareness and Warning System (TAWS) comprising a caution clearance sensor, said caution clearance sensor being a virtual surface calculated by an onboard computer delimiting an exploration volume of space in front of the aircraft that is compared to the topography of a corresponding terrain as supplied by an onboard terrain database, said caution clearance sensor having an origin corresponding to an extrapolated position of the aircraft few seconds to few tens of seconds ahead of a current position of the aircraft,
said method comprising:
adjusting via a computer position and orientation characteristics of said caution clearance sensor with respect to said published trajectory in order to match said reduced protection corridor,
said position adjusting comprising relocating said origin of said caution clearance sensor at a new predicted position corresponding to an extrapolated position of the aircraft assuming the aircraft is following the published trajectory, said origin being thus situated inside limits of said reduced protection corridor,
said orientation adjusting comprising orienting said caution clearance sensor to match said reduced protection corridor orientation taken at the relocated position,
wherein
if an estimated position of the aircraft presents a lateral deviation less than a first threshold relative to a prescribed trajectory, the position and orientation characteristics of the caution clearance sensor are adjusted so as to take into account direction characteristics of the published trajectory,
if the estimated position of the aircraft presents a lateral deviation greater than a second threshold relative to the prescribed trajectory, the position and orientation characteristics of the caution clearance sensor continue to be determined by the TAWS operating conventionally, and
if the estimated position of the aircraft presents a lateral deviation between the first and second thresholds relative to the prescribed trajectory, the position and orientation characteristics of the caution clearance sensor result from a combination between the adjustment as performed below the first threshold and the determination by the TAWS operating conventionally above the second threshold.

2. The method according to claim 1, wherein the caution clearance sensor has at least one characteristic chosen from opening, length, width, and gradient.

3. The method according to claim 1, wherein the caution clearance sensor is that of the TAWS whose characteristics are adjusted locally.

4. The method according to claim 3, wherein the local adjustment is performed for a given geographic area, a given aircraft speed, or a given heading of the aircraft.

5. The method according to claim 1, wherein the first threshold is approximately 1 Required Navigation Performance (RNP) and the second threshold is approximately 2 RNP.

6. The method according to claim 1, further comprising determining entry into and staying in a procedure with reduced protection corridor of the TAWS by correlation between a position of the aircraft and the published trajectory predefined in the onboard database and by calculating a probability of staying in the procedure with reduced protection corridor, while taking into account one or more of the following parameters: a dynamic range of the aircraft, the position of the aircraft, a horizontal speed of the aircraft, a vertical speed of the aircraft, an instantaneous route relative to the RNP trajectory predefined in the onboard database.

7. The method according to claim 1, further comprising generating a specific warning by the TAWS when, in the procedure with reduced protection corridor, the TAWS determines, under a prescribed altitude of the published trajectory, a distance between a profile of the at least one clearance sensor and a profile of the terrain being flown over that is less than a predetermined threshold.

8. The method according to claim 7, wherein the specific warning is a recover altitude warning that is generated when an altitude of the aircraft is lower than the prescribed altitude of the published trajectory.

* * * * *